United States Patent [19]

King et al.

[11] 4,133,021
[45] Jan. 2, 1979

[54] MULTIPLE UTILITY PEDESTAL

[76] Inventors: Harold M. King; Melvin L. Lesher, both of 5425 Longridge Ave., Las Vegas, Nev. 89102

[21] Appl. No.: 818,845

[22] Filed: Jul. 25, 1977

[51] Int. Cl.² .................. A47B 81/00; G01F 15/14
[52] U.S. Cl. .................................. 361/365; 73/201; 174/38; 312/100; 361/334; 361/390
[58] Field of Search ............... 174/38; 361/331, 332, 361/334, 365, 390; 73/201, 273; 312/100, 199

[56] References Cited

U.S. PATENT DOCUMENTS

| | | | |
|---|---|---|---|
| 1,617,626 | 2/1927 | Fitzgerald | 52/27 |
| 1,816,034 | 7/1931 | Wood | 312/100 |
| 2,041,112 | 5/1936 | Bucher | 361/334 |
| 2,274,106 | 2/1942 | Strong et al. | 312/100 |
| 3,111,030 | 11/1963 | Whitman | 73/273 |
| 3,286,133 | 11/1966 | Sturdivan | 361/365 |
| 3,614,538 | 10/1971 | Nickola | 174/38 |
| 3,631,324 | 12/1971 | Jones | 361/334 |
| 3,800,063 | 3/1974 | DiMaggio et al. | 174/38 |

Primary Examiner—Mervin Stein
Assistant Examiner—Alex Grosz
Attorney, Agent, or Firm—Seiler & Quirk

[57] ABSTRACT

An improved utility pedestal is a completely enclosed, ground-mounted container adapted to hold multiple utility metering and shut-off devices for a plurality of users. Partitions inside the pedestal separate the interior into a series of user-accessible compartments containing valves and connections, and separate locked compartments which contain metering devices and which are accessible only to the appropriate utility company. The enclosed meters are readable through transparent windows in each locked section. Incoming and return conduits to the pedestal are guided by a preformed template.

14 Claims, 11 Drawing Figures

MULTIPLE UTILITY PEDESTAL

BACKGROUND OF THE INVENTION

In developing residential building lots it has always been necessary for the developer or builder to have separate utility lines run to each home building lot. Each utility company such as the gas company, electric power company, water company, and telephone company must run separate lines from the main lines to the residence. Installation of each line requires placement of a conduit to carry the utility and a separate meter for each residence. These meters are not consistently located at each residence; for example, many homeowners do not know where their water meter and shutoff valve is located. When the lines are placed underground, separate trenching must occur for each utility from the main line to the location at the house where the utility line enters the structure. Utility meters such as electric or gas meters which require periodic reading are often inconveniently placed and difficult to find. Frequently, these meters are located in a fenced-in yard which may make accessability to the meter reader hazardous, for example, if a dog is in the yard.

Many other disadvantages arise from the usual location of the utility meters. For example, electric and gas meter shut-offs are generally immediately adjacent the residence, thereby causing significant danger in the event of a fire. Water meters are generally located below ground level and any leakage from the meter simply penetrates the ground. As a result, it is estimated that many millions of gallons of water a year are lost as a result of leaky water meters from which the leakage is not detected. In addition, in recent years, the rapid increase in costs of electric power has spawned substantial theft of power from the power company by homeowners who tamper with the electric meters in an effort to bypass the meters.

In general, pedestals for mounting utility meters are well known. For example, Sturdivan, U.S. Pat. No. 3,286,133 discloses an electrical meter pedestal which comprises a rectangular housing mounted on a cement pad and fabricated from a plurality of slidably engageable panels which can be used to form pedestals of different shapes and sizes. Whitman, U.S. Pat. No. 3,111,030, also shows a ground-mounted pedestal for a gas meter having a transparent window thru which the meter can be read. Another protective meter enclosure is shown in Fisher, U.S. Pat. No. 3,181,714. The pedestal described therein also is a weather resistant housing having a window therein for reading the meter.

It is also known to have mounting pedestals adapted to mount meters and junction boxes from various utilities on a single pedestal. For example, Nickola U.S. Pat. No. 3,614,538, shows a single post for a mobile home park for mounting a power box, electric meter, telephone box, the pedestal disclosed in this patent is useful only for a single trailer.

Accordingly, it is an object of the invention to provide a multiple utility pedestal which will completely enclose metering devices for several different utilities. It is a further object of the invention to save time and money in trenching and locating utility conduits. It is a further object of the invention to provide a meter pedestal which is conveniently located and easily readable by the utility companies.

It is still a further object of the invention to provide a utility meter pedestal which can hold the meters for at least two separate residential units. It is yet a further object of the invention to save equipment installation and parts cost by replacing certain parts associated with utility metering for multiple residence with a single part. These and other objects of the invention are achieved by the multiple utility pedestal, a specific and preferred mode of which is hereinafter described.

SUMMARY OF THE INVENTION

A multiple utility pedestal for servicing a plurality of users comprises an enclosed housing having a plurality of walls, a first lockable compartment for containing at least two electrical utility meters, a second lockable compartment for containing at least two meters of a different utility, separate door means for each compartment, window means for viewing each meter outside of the housing, a separate series of compartments adjacent the first and second compartments for mounting conduits and valve means for utilities enclosed by said housing, and door means to provide access to each said second series of compartments.

BRIEF DESCRIPTION OF THE DRAWINGS

The drawings illustrate a specific embodiment of the present invention as follows.

DETAILED DESCRIPTION OF THE INVENTION

Figure 1:
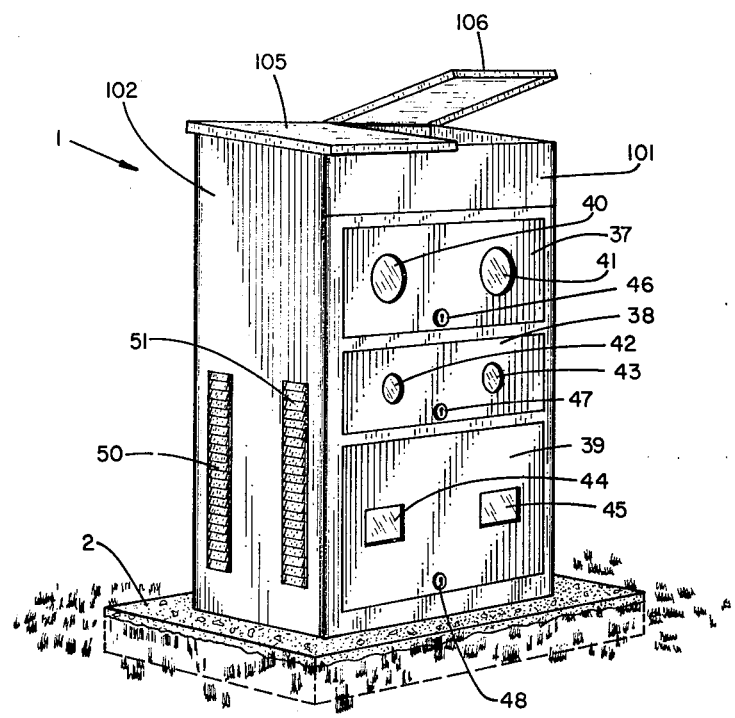
FIG. 1 is a perspective front view of a utility pedestal according to the invention with the front doors shown in closed position.

Referring to the drawings, pedestal 1 has a housing formed by front wall 101, side walls 102 and 103, and rear wall 104. The upper section of the pedestal consists optionally of mailboxes having front-opening hinged covers 105 and 106. The bottom panel 10 of the mailboxes also serves as the top wall of the pedestal housing.

FIG. 1 shows a perspective front view of pedestal 1 mounted in the ground on concrete base 2. The pedestal consists of four vertical sections separated by three horizontal partitions which extend the full width of the pedestal. Top section 3 is a mailbox section which has as its floor horizontal partition 10. Immediately beneath the mailbox section is a section 4 for containing electric meters. The floor of this section is defined by partition 11. The horizontal section beneath the electric meter is water meter section 5 having a floor defined by partition 12. The bottom section 6 is for the gas meters. The bottom of the pedestal is open and sets directly into concrete base 2.

Figure 5:
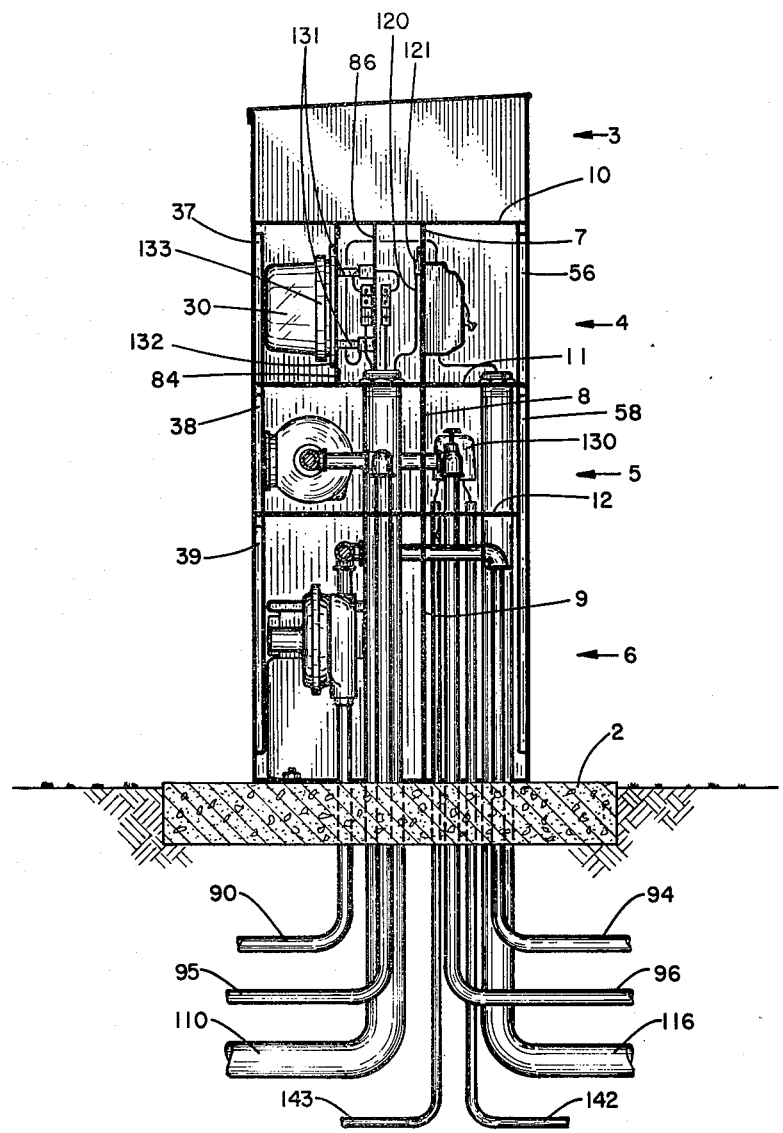
FIG. 5 is a side section view of the pedestal in use.

As best seen in FIG. 5, the utility-containing sections of the pedestal are separated into forward and rearward compartments by vertical partitions 7, 8, and 9, which extend the full width of the pedestal. These partitions may be separate pieces attached to the horizontal partitions 10, 11, and 12, or may be one single piece extending between partitions 10 and the bottom of the pedestal.

The above-described partitions divide the utility holding portions of the pedestal into three forward and six rear compartments. The three forward compartments 15, 16, and 17 hold the electric, water, and gas metering devices respectively, and are accessible to the appropriate utility company. The rear compartments 18, 19, 20, 21, 22, and 23 are located immediately behind the forward compartments and are accessible to the utility users. Compartments 18, 20, and 22 are the electric, water, and gas portions accessible to one user, while compartments 19, 21, and 23 are the electric, water, and gas portions accessible to a neighboring user. Each of these compartments correspond to the meter which is located directly forward of the compartment.

Figure 3:
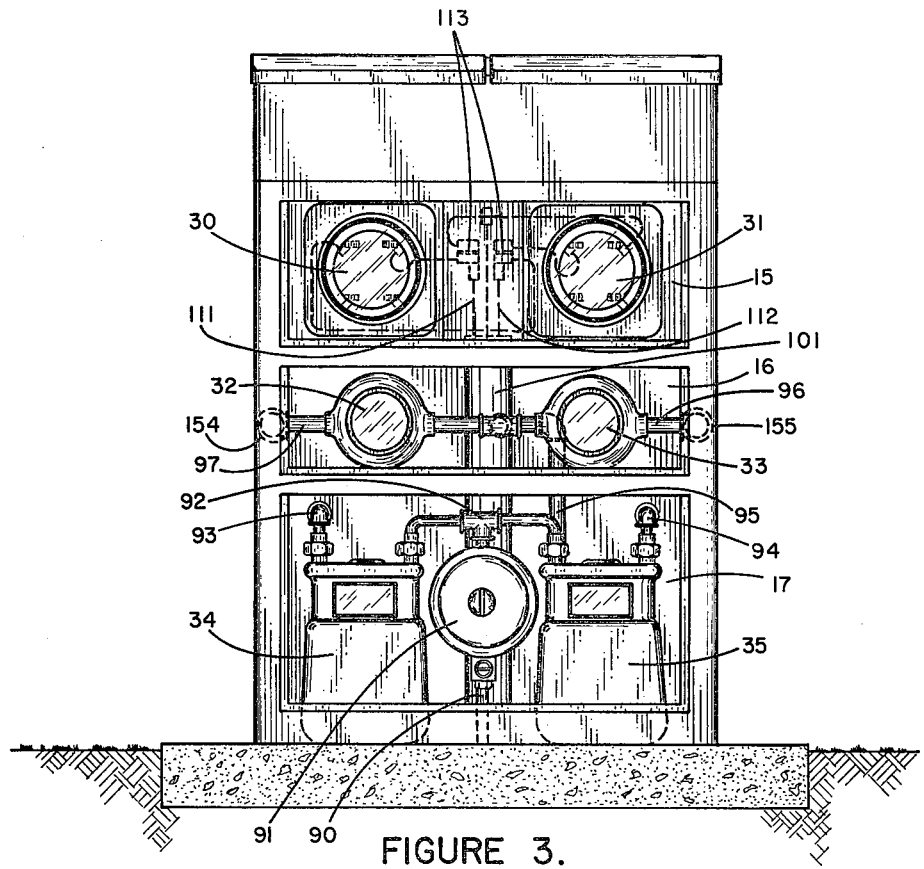
FIG. 3 is a front view of the invention with the meters in position and the doors removed.

As shown in FIG. 3, electric meter sockets 30 and 31 for holding conventional electric meters are located in compartment 15. Similarly, water meters 32 and 33 are located in compartment 16 and gas meters 34 and 35 are located in compartment 17.

Figure 6:
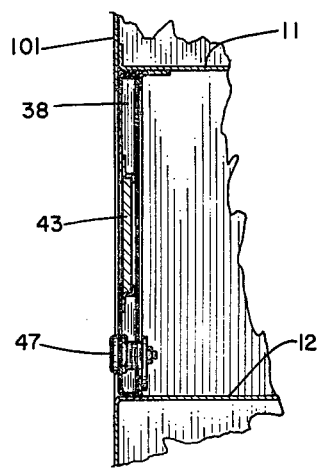
FIG. 6 is a section view of a front door to the pedestal.
Figure 7:
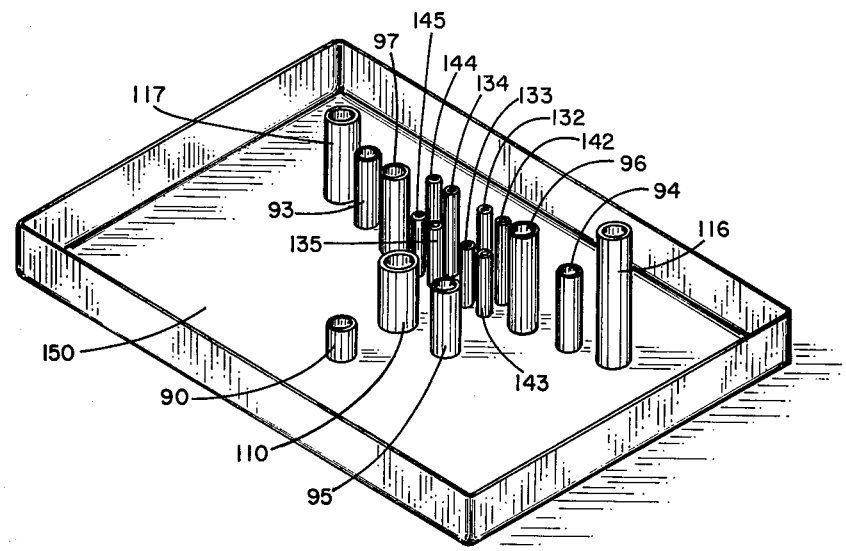
FIG. 7 is a perspective of the ground template with guide conduits in place.

Forward compartments 15, 16, and 17 are closed respectively by removable doors 37, 38, and 39. Windows 40, 41, 42, 43, 44, and 45 fabricated from ¼ inch Plexiglas allow easy reading of the meters from outside of the pedestal without opening the doors. Each door in the front of the pedestal is completely removable rather than being hinged so that the door will not interfere with any repair work that needs to be done by the utility company in the compartment (see FIG. 6). The doors are maintained in normally locked position with locks 46, 47, 48; keys to each lock are held in the possession only of the appropriate utility. For example, the keys to lock 46 are maintained by the electrical utility company. The lock is a conventional lever-type lock having a locking arm which rotates into place behind a vertical lip which extends upward from the floor of each compartment (see FIG. 6). Each door is maintained in place by placement of the upper edge of the door in a slot formed by the extension of front wall 101 and a downward lip extending from the ceiling of each forward compartment (also shown in FIG. 6).

Louvers 50, 51, 52, and 53 are located on the sides of the pedestal to vent any leakage therein. Louvers 51 and 52 are located on either side of the bottom two forward compartments and 50 and 52 extend along the sides of the corresponding rear compartments. In the event that any leakage occurs in the water meters, or associated piping, it will immediately be visible by leakage through the louvers and can quickly be repaired. Any leakage associated with the gas meters would also be vented to the atmosphere through the louvers.

Figure 2:
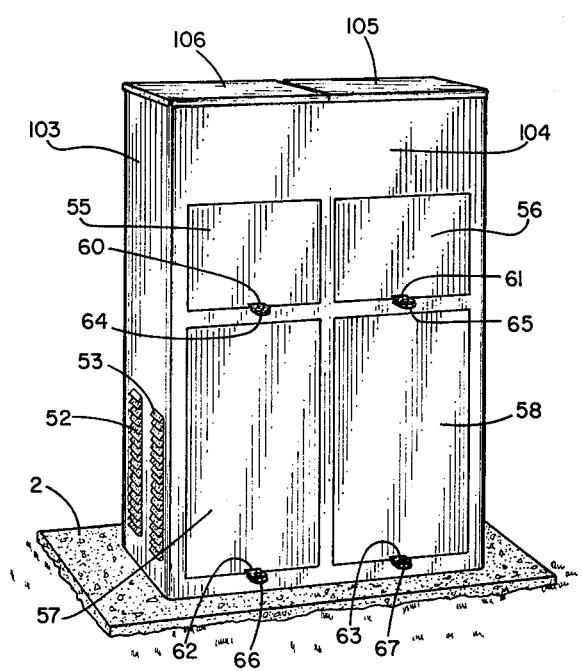
FIG. 2 is a generally rear perspective of a pedestal of the invention with the rear compartment doors in closed position.

The rear compartments are closed by doors 55, 56, 57 and 58 in rear panel 104. Although only one door panel for each side of the rear compartments is necessary, two doors for each side are preferable for safety reasons, with a separate door for the electrical compartment. These doors may be locked by attaching a padlock through the parallel set of interlocking tabs fastened to the door and the rear wall. The tabs on the doors are identified by numerals 60, 61, 62 and 63; the corresponding tabs on the rear wall are identified by numbers 64, 65, 66, and 67 respectively (see FIG. 2). The three rear compartments of each user are separated from those of the other user by vertical panel 70.

Figure 9:
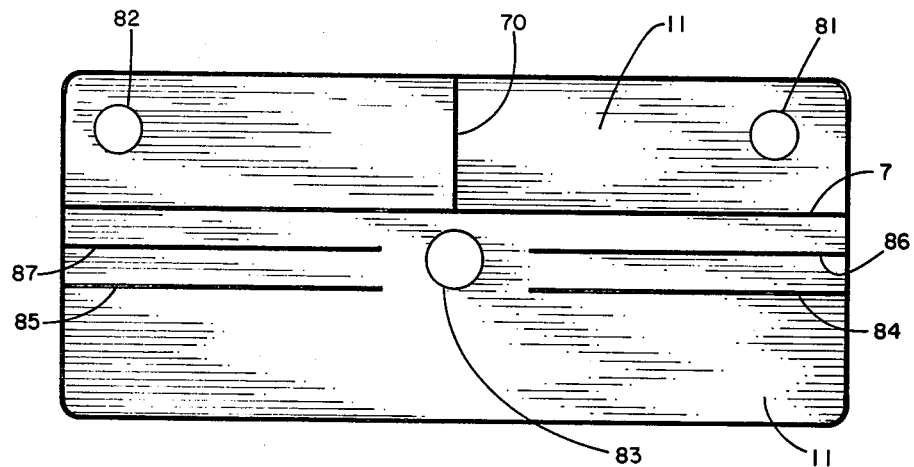
FIG. 9 is a horizontal section view of the top (electric) utility compartments.
Figure 10:
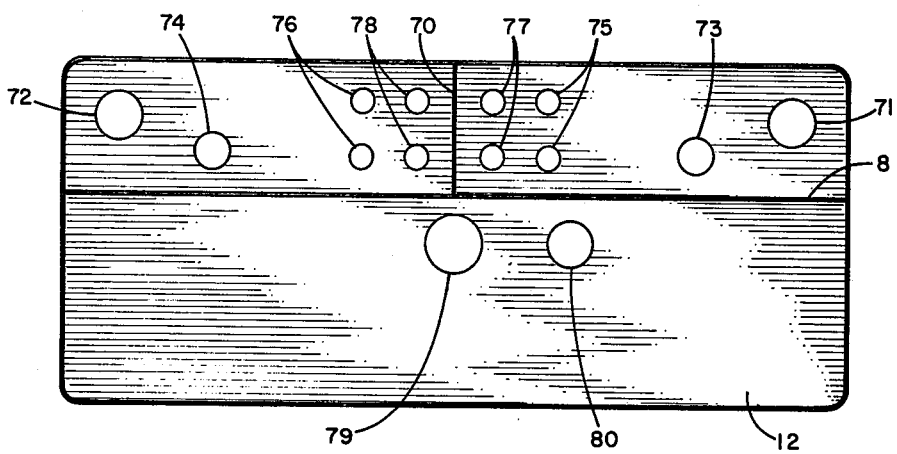
FIG. 10 is a horizontal section view of the middle (water) utility compartment.
Figure 11:
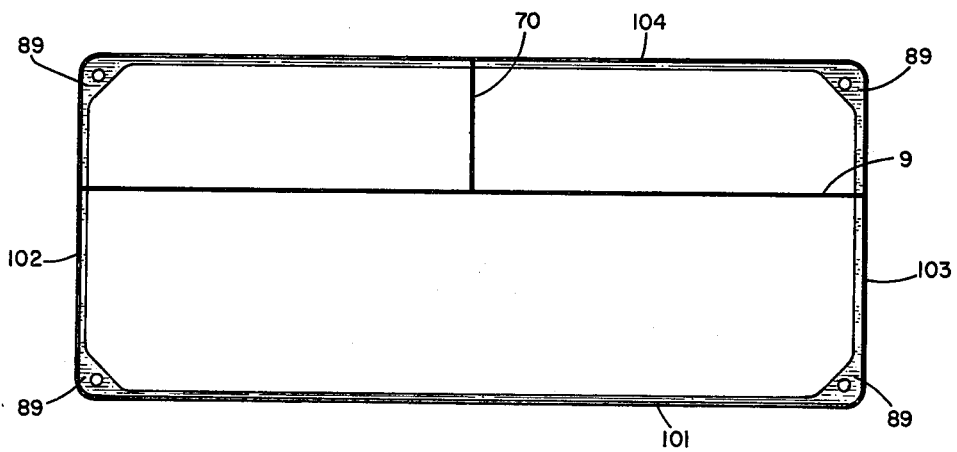
FIG. 11 is a horizontal section view of the bottom (gas) utility compartments.

FIGS. 9, 10, and 11 show horizontal sections of the electric, water, and gas portions of the pedestal respectively. FIG. 11 shows the gas section which is open at the bottom and which has vertical partitions 9 to separate the utility from the user portion and 70 to separate the two user portions. Flanges 89 in each corner of the frame carry bolt-receiving holes to secure the unit to the concrete slab. FIG. 10 shows base plate 12 and vertical partitions 8 and 70 having the same purpose as in FIG. 11. In addition, floor 12 has a series of openings to permit passage of conduits of the various utilities. In the forward portion of the compartment, opening 79 permits passage of the electrical conduit whereas opening 80 permits passage of the water conduit. Each user compartment has identical openings for the various utilities. Opening 71 and 72 allow passage of the electrical utility down to the residence, while openings 73 and 74 similarly permit passage of the water conduit. Apertures 75 and 76 permit passage in and out for television cables, while apertures 77 and 78 permit incoming and outgoing passage of telephone wires.

FIG. 9 shows floor 11 of the electric section of the pedestal containing incoming conduit opening 83 and opening 81 and 82 which permit passage of the electric utility conduits to the home. In the utility portion of the electric section are the electric meter mounting plates for each electric meter. Each meter mounting consists of two vertical sheet metal panels which extend from the floor to the ceiling of the section. Conventional meter mounting prongs are fastened to rear plates 86 and 87 while the face plate is fastened to front mounting panels 84 and 85. The meter mounting plates are spaced several inches in front of partition 7 which separates the utility from the user compartments of the section to insure that a user would have substantial difficulty in obtaining access to the utility compartment through partition 7 to tap into the power supply before it is metered.

Vertical center panels 7, 8, and 9 are solid except for a plurality of holes which permit passage of the utility conduits from the utility company's compartments to the users' compartments. Holes 150, 151, 152, and 153 allow passage of electrical wires; holes 154 and 155 allow passage of the water pipes, and 156 and 157 allow passage of the gas pipes.

Figure 8:
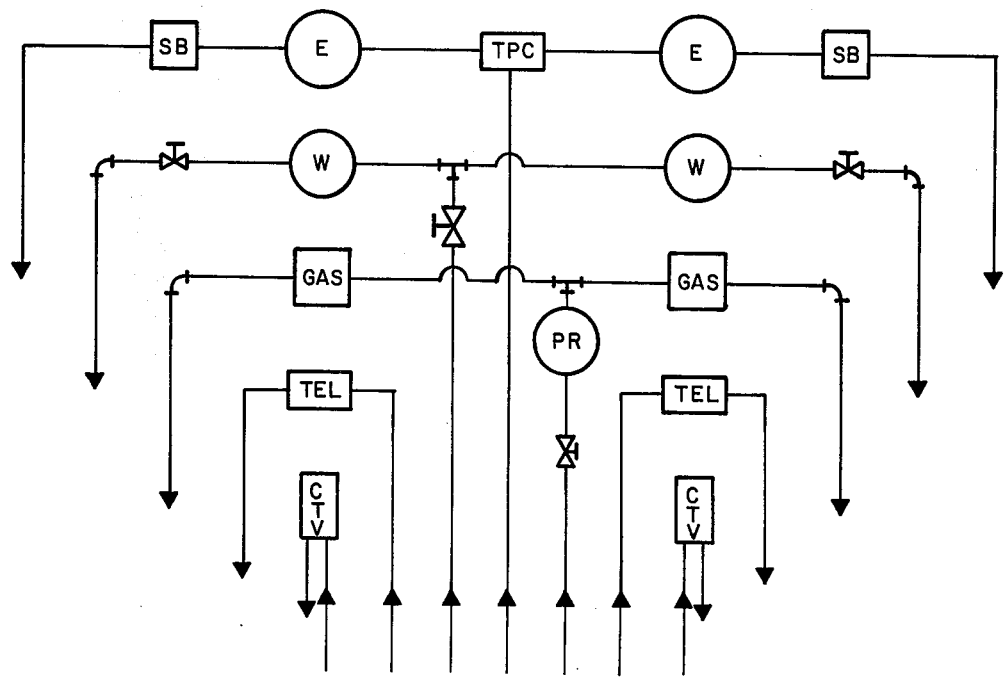
FIG. 8 is a flow diagram of the utilities into and out of the pedestal.

FIG. 8 shows a schematic flow diagram of utilities into and out of the pedestal. On the diagram the symbols "E" "W" and "Gas" refer to the electric water and gas meters. Symbols "Tel" and "CTV" refer to the telephone and cable television terminals and "PR" refers to the gas pressure regulator. In the electrical system "TPC" refers to terminal post connectors and "SB" refers to breaker switches. It is of particular interest to note that with the pedestal of the invention, the gas company can save the use of one pressure regulator whereas in most cases a separate pressure regulator would be needed to be used for each residence. The particular flow scheme of the invention allows a single pressure regulator to service two meters. Not shown in the drawings is an optional gate valve in the gas line downstream of the meter, allowing the homeowner to shut off his own gas supply.

Figure 4:
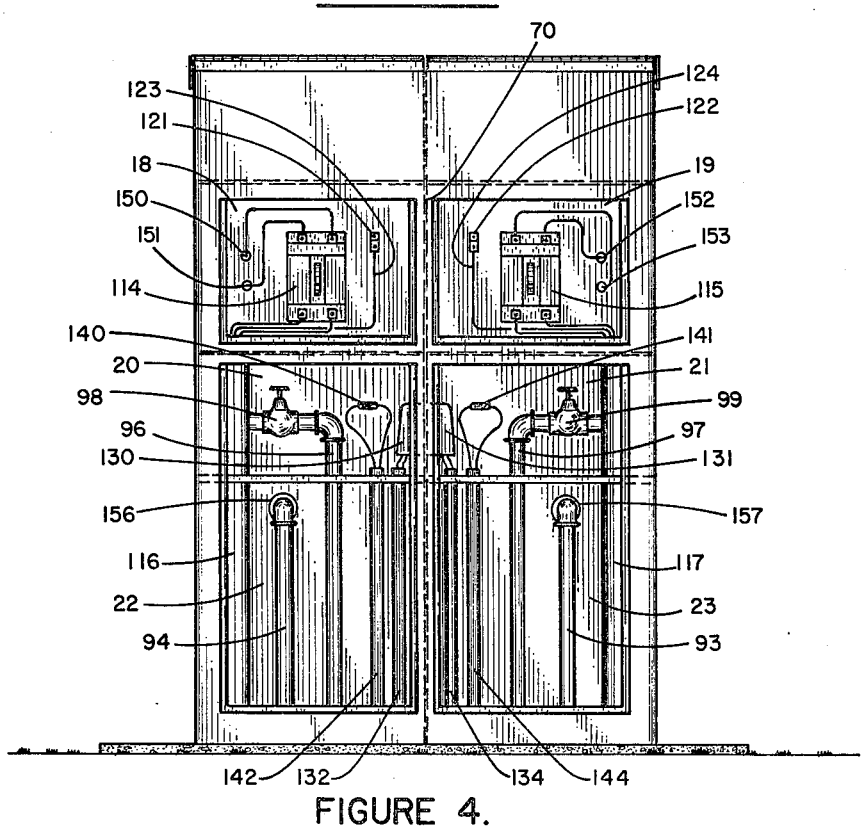
FIG. 4 is a rear view of the pedestal showing conduits, switches, valves in position with the doors removed.

FIGS. 3, 4, and 5 show a pedestal fully assembled with conduits, meters, and accessories. Referring to FIG. 3, natural gas enters compartment 17 through pipe 90, pressure regulator 91, then divides at tee 92 to pass through meters 34 and 35. Metered gas exits the meter through pipes 93 and 94, passes through partition 17 into the user's side, and descends back to the trench to each user's house. Water enters the pedestal through pipe 95 which extends through opening 80 and partition 12 and into compartment 16. Water passes through a tee through both water meters 32 and 33 and leaves through pipes 96 and 97. These pipes extend through openings in panel 8 into user compartments 20 and 21. Valves 98 and 99 in the lines allow easy shutoff for the user with conventional hand operated gate valves. This arrangement allows the user to shut off the water to his home quickly and easily without special tools.

Electrical wires enter the pedestal through conduit 110 which extend upward through the pedestal through openings 79 and 83 in partitions 12 and 11. Incoming hot wires 111 and 112 pass to terminals 113 and then extend to the top prongs on each of the meter mounts (shown as dashed lines in FIG. 3). Return wires from the lower prongs on the meter mounts extend back to the terminal through openings in partition 7 to the user compartments 18 and 19 to breaker switches 114 and 115. Electrical wires extend to the house from the breaker switch through return conduits 116 and 117. A common wire 120, which enters the pedestal through conduit 110, extends directly to terminals 121 and 122 which have contacts on either side of partition 7. Common wires 123 and 124 extend from these terminals to the respective users' houses through conduits 116 and 117.

FIG. 5 shows electric meter 130 mounted in place in compartment 15. The meter is conventionally mounted by having plugs on the rear of the meter insert into mounting prongs 131 which are conventionally mounted on back mounting plate 86. Locking plate 132 is fastened on front mounting plate 84. After the meter is inserted into the socket, a mounting ring 133 which engages the mounting plate and the meter is put in place and locked, thereby preventing removal of the meter. This locking assembly is conventional and is shown for example in Sloop, U.S. Pat. No. 3,440,330 issued Apr. 22, 1969.

In user compartments 20 and 21 are located fused terminal post connectors for telephone line connections designated as 130 and 131. These are conventional phone line connectors mounted on side panel 70 and have wires extending to and from the box through plastic pipe conduits 132, 133, 134, and 135.

Provision is also made for cable tv terminals 140 and 141 mounted on the rear wall 8 of compartments 20 and 21. Incoming and exit wires to and from these terminals pass through conduits 142, 143, 144 and 145. Of course, any additional utilities which could ultimately be supplied to a residence could also be supplied thru this pedestal.

Installation of the pedestal and the lines leading to and from the pedestal is a relatively simple matter. Utility lines are brought to the area of the pedestal and appropriate trenching is carried out between the pedestal location and the two houses. At this point, the lines are threaded through a vacuum-formed lightweight plastic template 150 having dimensions of approximately 42 inches long, 30 inches wide, and 4 inches deep. After all of the conduits are aligned through the template, the template is fixed in the ground at a depth of about 4 inches and is filled with concrete. For utilities which come in pipes, e.g., water and gas, no additional conduit is necessary for feeding the pipes through the concrete; however, additional conduits such as plastic pipes are provided to thread electrical telephone and television cables thru the concrete. After the concrete is dry, the pedestal is placed over the template and is bolted to the concrete via bolt holes in flanges 89 in the pedestal. After the pedestal is in place, completion of wiring connections, piping, and installation of meters is easily accomplished.

While the dimensions of the pedestal obviously vary, typical dimensions for a conventional application involving service for two adjacent residences are as follows: excluding the mailbox section, the pedestal has a height of 36 inches and a depth of 18 inches. The gas meter section has a height of about 16 inches. The height of the water meter section is about $9\frac{1}{2}$ inches, and the height of the electric meter section is about $10\frac{1}{2}$ inches. The vertical partition which separates the user compartments from the utility compartments is located about $12\frac{1}{2}$ inches back from the front of the cabinet. The pedestal is fabricated from 14 gauge steel; joints in the sheet metal are spot welded. All meters, meter mounts, valves, pipes and utility junctions mounted within the pedestal are conventional and well known to those skilled in the art.

Although relatively simple in concept, the pedestal described above has a series of advantages which in total provide many unexpected advantage for the invention. As mentioned above, the pedestal saves the gas company the use of one pressure regulator out of every two normally required. Leaks from the water and gas meters are readily detected. Meters are easily read by utility company personnel simply by driving along the front of a residence. Additionally, only one stop need be made for reading each set of two meters. The electric meter location and mounting method create initial inaccessability of the electric meters, making theft of power extremely difficult. By combining the metering facilities for two users at one location, utility companies will have fewer easement problems and less trenching, and will also save on the amounts of piping and wiring required. The central location of all utilities renders shutoff easily but separately accessible to the homeowner and to the utility for repairs or for change of customers. The location of the utility shutoffs at a distance remote from the house is an additional safety factor; for example the utilities could easily be shutoff at once in the event that fire were to occur in the house. The pedestal also facilitates adaptation of telemetering of utility bills, i.e., automatic transmission of utility meter readings over telephone lines, since the inner connection between the meters and the telephone lines could easily be made in the pedestal of the invention.

Many modifications to the inventions, a specific mode of which has been described in detail will be immediately apparent to one skilled in the art. For example, multiple units may be attached together or prefabricated to serve larger multiples of residences, for example, four or eight. Such a system would be particularly useful for apartments or condominiums which are located in cluster groups. The pedestal is also easily adapted to coin operation of all utilities, simply by placing available coin-operated devices on the pedestal. Accordingly, although only a preferred embodiment has been described in detail, the invention should be limited only by the following claims.

I claim:

1. A pedestal for housing utility metering devices for a plurality of users comprising a housing, a first compartment within said housing for containing electrical utility metering devices, mounting means in said first compartment for securing at least two electrical utility meters therein, a second compartment for containing at least two water meters, third and fourth compartments adjacent and having a common wall with said first compartment for containing electrical shutoff devices, compartments adjacent to and having a common wall with said second compartment for containing water shutoff devices, apertures in said common walls to permit passage of utility conduits, and door means for each of said compartments to permit access thereto from outside of the pedestal.

2. The pedestal of claim 1 also comprising lock means on each of said door means for said first and second compartments for securing said first and second compartments against unauthorized access thereto.

3. The pedestal of claim 1 also comprising lock means for each of said door means for said third and fourth compartments for preventing unauthorized access thereto.

4. The pedestal of claim 1 also comprising separate lock means for each door means to said first compartments and separate lock means for each door of said third and fourth compartments for prohibiting unauthorized access to any of said compartments.

5. The pedestal of claim 1 also comprising window means in each door means for the meter-containing compartments for viewing the settings of utility meters within said compartments.

6. The pedestal of claim 1 also comprising a gas utility compartment for housing a plurality of gas meters, and mounting means for securing said gas meters to the housing secured to the interior of said compartment.

7. The pedestal of claim 1 also comprising at least two separate mailbox compartments, and door means for each mailbox compartment permitting access thereto from outside of the housing.

8. The pedestal of claim 1 having an open bottom portion and also comprising a template for orienting utility lines in the pedestal, and fastening means for securing the pedestal to a concrete pad.

9. A pedestal for housing utility metering devices for a plurality of users comprising an enclosed housing having outside walls, a first compartment within said housing for containing at least two electrical utility meters, said compartment having walls and being defined in part by outside walls of the housing, mounting means in said compartment for mounting said meters in the compartment, first door means in a wall of the housing to permit access to said compartment, window means in a wall of the housing to permit reading of the meters from outside of the housing, a second compartment housing shutoff means for the electrical utilities, separate from and having a common wall with said first compartment having walls and being defined in part by walls of the housing, door means in a wall of the housing to permit access to said second compartment, at least one opening in a wall between the first and second compartments to permit passage of an electrical conduit therethrough, a third compartment within said housing for containing at least two utility meters other than electrical utility meters, said compartment having walls and being defined in part by walls of the housing, door means in a wall of the housing to permit access to said compartment, window means in a wall of the housing to permit reading of the meters therein from outside of the housing and, a fourth compartment within said housing for housing utility shutoff means, having a common wall with said third compartment being defined in part by walls of the housing, door means in a wall of the housing to permit access to the fourth compartment, and at least one opening in a wall between the first and second compartments to permit passage of a utility conduit therethrough.

10. The pedestal of claim 9 wherein the housing has a front wall and a rear wall, the first and third compartments within said housing are defined in part by the front wall, the door means for said first and third compartments are in said front wall, said second and third compartments are defined in part by said rear wall, and said door means to said second and fourth compartments are located in said rear wall.

11. The pedestal of claim 9 also comprising lock means on each of said door means for preventing unauthorized access to the compartments.

12. The pedestal of claim 9 also comprising window means in the housing for viewing the settings of utility meters therethrough.

13. A residential utility system comprising a ground-mounted pedestal which comprises an enclosed housing, a first compartment for enclosing electrical utility meters, a plurality of electrical meters mounted within said compartment, second and third compartments adjacent said first compartment for enclosing electrical shutoff devices, an electrical shutoff device mounted in each of said second and third compartments, a fourth compartment for enclosing water or gas meters, a plurality of water or gas meters mounted in said fourth compartment, fifth and sixth compartments adjacent said fourth compartment for enclosing water or gas shutoff devices, apertures in common walls between compartments housing meters and compartments housing shutoff devices to permit passage of utility conduits, and door means for each compartment to permit access thereto from outside of the pedestal.

14. The system of claim 13 wherein the fourth compartment contains a plurality of water meters, and the pedestal also comprises a seventh compartment for enclosing a plurality of gas meters, a pressure reducing device mounted in said seventh compartment, and a plurality of gas meters mounted in said seventh compartment.

* * * * *